(12) United States Patent
Cousin et al.

(10) Patent No.: US 8,935,930 B2
(45) Date of Patent: Jan. 20, 2015

(54) USE OF A MIXTURE OF CARBON DIOXIDE SNOW AND LIQUID NITROGEN IN QUICK FREEZING APPLICATIONS

(75) Inventors: Franck Cousin, Saint Brevin les Pins (FR); Willy Frederick, Clerac (FR); Nicolas Fachon, Air Liquide Sa-Dpi (FR)

(73) Assignee: l'Air Liquide Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 1829 days.

(21) Appl. No.: 12/301,374

(22) PCT Filed: Apr. 26, 2007

(86) PCT No.: PCT/FR2007/051178
§ 371 (c)(1),
(2), (4) Date: Oct. 26, 2009

(87) PCT Pub. No.: WO2007/135308
PCT Pub. Date: Nov. 29, 2007

(65) Prior Publication Data
US 2010/0047424 A1    Feb. 25, 2010

(30) Foreign Application Priority Data
May 18, 2006    (EP) ..................................... 06300493

(51) Int. Cl.
F25D 17/02    (2006.01)
A23L 3/375    (2006.01)
A23G 9/06    (2006.01)
F25D 3/12    (2006.01)

(52) U.S. Cl.
CPC . *A23L 3/375* (2013.01); *A23G 9/06* (2013.01); *F25D 3/12* (2013.01); *A23V 2002/00* (2013.01)

USPC .............................................................. 62/64

(58) Field of Classification Search
USPC ............................... 62/64, 171, 384; 426/524
See application file for complete search history.

(56) References Cited

U.S. PATENT DOCUMENTS

| | | | |
|---|---|---|---|
| 3,393,152 A | 7/1968 | Smith et al. | |
| 3,685,308 A | 8/1972 | Lundquist | |
| 3,765,904 A * | 10/1973 | de Roissart et al. | 426/384 |
| 4,597,266 A | 7/1986 | Entrekin | |
| 4,631,250 A | 12/1986 | Hayashi | |
| 4,687,672 A * | 8/1987 | Vitkovsky | 426/524 |
| 5,577,392 A * | 11/1996 | Engler et al. | 62/380 |
| 6,079,215 A | 6/2000 | Wisniewski | |
| 6,170,269 B1 | 1/2001 | Wisniewski | |
| 6,183,795 B1 | 2/2001 | Yates | |
| 6,279,328 B1 | 8/2001 | Leeds | |
| 6,418,732 B1 | 7/2002 | Klane et al. | |
| 6,531,173 B2 * | 3/2003 | Brooker | 426/524 |
| 2001/0025495 A1 * | 10/2001 | Newman et al. | 62/63 |
| 2002/0139126 A1 * | 10/2002 | Butler | 62/64 |
| 2002/0162349 A1 * | 11/2002 | Lang et al. | 62/381 |

FOREIGN PATENT DOCUMENTS

EP    1 442 873    8/2004

OTHER PUBLICATIONS

International Search Report for PCT/FR2007/051178.

* cited by examiner

*Primary Examiner* — Melvin Jones
(74) *Attorney, Agent, or Firm* — Christopher J. Cronin

(57) ABSTRACT

Method for cooling a product, all or part of the cooling being carried out by contact of the product with a mixture of carbon dioxide snow ($CO_2$) and liquid nitrogen.

14 Claims, 1 Drawing Sheet

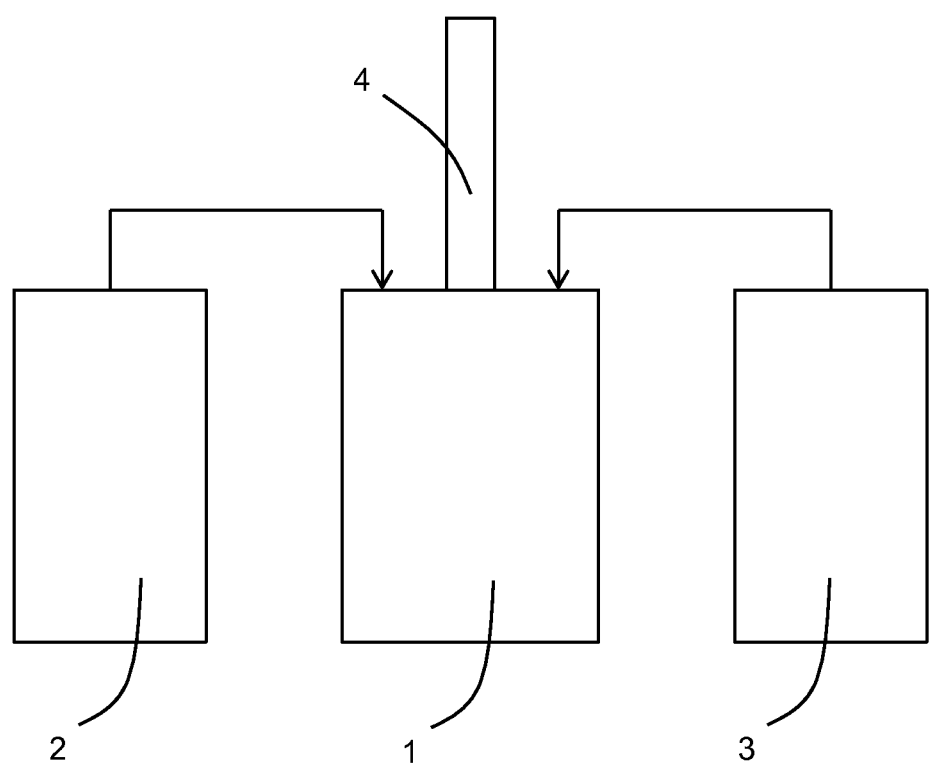

USE OF A MIXTURE OF CARBON DIOXIDE SNOW AND LIQUID NITROGEN IN QUICK FREEZING APPLICATIONS

CROSS-REFERENCE TO RELATED APPLICATIONS

This application is a §371 of International PCT Application PCT/FR2007/051178, filed Apr. 26, 2007.

BACKGROUND

The invention relates to the field of heat transfer between a cryogenic fluid and a product to be chilled, especially a food product, and to the means for improving such a transfer.

SUMMARY OF THE INVENTION

There is provided a process for chilling a product, comprising contacting the product with a mixture of carbon dioxide snow and liquid nitrogen. The process may include one or more of the following aspects:
the process further includes the steps of:
producing the mixture of carbon dioxide snow and liquid nitrogen by mixing the carbon dioxide snow and liquid nitrogen in a tank with a variable-speed mixer;
measuring a conductivity of the mixture; and
adjusting a rate of stirring of the stirrer based upon the measured conductivity.
the product is a food product.

BRIEF DESCRIPTION OF THE FIGURES

The FIGURE illustrates a tank and mixer for producing a mixture of carbon dioxide snow and liquid nitrogen.

DETAILED DESCRIPTION OF THE INVENTION

As will be seen below in greater detail, proposed according to the present invention is the use of a cryogenic mixture or "cocktail" (or "slurry") composed of a mixture of carbon dioxide snow $CO_2$ and liquid nitrogen that makes it possible to obtain a more or less milky liquid having a certain viscosity that can be adjusted and a much higher cooling capacity.

This solution specifically makes it possible, as will be seen, to increase the contact heat transfer and to have a higher cooling capacity.

Mentioned above is the example of an agri-food application, but more widely this solution can be used in any step of processes that require rapid cooling by contact, such as the agri-food industry and the cryogenic fitting of mechanical parts; ground freezing, the rapid cooling of hot products such as in the case of cement works, etc.

The preparation of such a solution may be carried out, for example, using a tank, which may or may not be equipped with a mixing screw, into which liquid nitrogen is poured, then using a horn the carbon dioxide snow is deposited on the surface of the nitrogen, and then the mixing is carried out (but spontaneously the whole assembly starts to "boil", producing the mixture), but it is also possible to use an injection of $CO_2$ into the bottom part of a tank containing liquid nitrogen, which makes it possible to substantially improve the dissolving operation.

The dissolving of $CO_2$ must be carried out with stirring which will be a function of the amount of $CO_2$ that it is desired to dissolve in the liquid nitrogen.

As illustrated in the FIG, it is possible to envisage, from an industrial point of view, a tank 1 supplied by two source reservoirs (liquid nitrogen and $CO_2$) 2, 3, this tank 1 being equipped with a stirrer 4 advantageously having a variable-speed drive that enables the suspension of $CO_2$ in nitrogen regardless of the envisaged concentration. This tank 1 therefore constitutes a temporary mixture storage device from which the final user station is supplied.

But it is also possible to envisage in-line mixing (in the pipework) and thus to avoid intermediate storage.

It should be noted that the concentration of carbon dioxide snow in liquid nitrogen makes the conductivity of the mixture vary, this is because $CO_2$ is a polar molecule. A measurement of the variation in conductivity of the medium will therefore be indicative of a variation in the amount of $CO_2$ in suspension in the mixture.

It can therefore be envisaged to set up a control in the following manner: a probe for measuring the conductivity of the mixture may be connected to the stirrer motor or to its variable-frequency drive and therefore may stir the mixture more or less rapidly depending on the desired concentration.

The invention therefore relates to a process for chilling a product, of the type where all or some of the chilling is carried out by contact of the product with a cryogenic fluid, and is characterized in that the cryogenic fluid is a mixture of carbon dioxide snow ($CO_2$) and liquid nitrogen.

Therefore, the sub-cooling of the $CO_2$, as it were, is thus carried out in order to enable it to achieve a higher cooling capacity, by making it pass from a temperature close to −80° C. to a temperature close to −196° C.

The amount of liquid nitrogen added makes it possible to adjust the viscosity of the type of "slurry" that is obtained, in order, according to the envisaged applications, to be able to optimize the contact time with the product to be chilled: specifically, it is imagined that by bringing the product into contact with a viscous mixture it will be possible to obtain longer contact times, and improved cooling efficiencies. Depending on the envisaged applications, use will preferably be made of a content of snow in the solution between 5% and 80%.

Typically when the product is brought into contact with liquid nitrogen alone, it is observed that a crusting of the product takes place almost immediately, then preventing the transfer of refrigeration (calefaction phenomenon, i.e. creation of a gas layer around the product, acting as an insulator).

By bringing the product into contact with carbon dioxide snow alone, there is certainly no calefaction phenomenon observed around the product, but on the other hand, in view of the temperature of the snow (close to −80° C.), it may be considered that the available cooling capacity is limited.

On the other hand, by bringing the product into contact with a solution of carbon dioxide snow and liquid nitrogen according to the invention, a substantial decrease in the calefaction phenomenon is observed and, furthermore, the cooling capacity is high since the contact time between the mixture and the product is increased on account of the viscosity of the mixture, the core temperature of the product decreases rapidly and the heat transfer is optimized.

Other features and advantages will emerge from the following description of tests of embodiments of the invention.

In order to simply demonstrate at first the substantial improvement according to the invention of the heat transfer (in this case refrigeration) to the product, firstly the following very simple tests were carried out on commercial beefburgers (15% fat):
a mixture of carbon dioxide snow and liquid nitrogen according to the invention was prepared according to the method described above (incorporation of $CO_2$ until a range of 15 to 30% of $CO_2$ and a temperature of around −190° C. were obtained);

a control bath of liquid nitrogen alone was also prepared; the initial temperature of the beefburgers was +3° C.; the following results were then observed:

a) After immersing the burgers in liquid nitrogen for 15 seconds their core temperature had still not dropped.
 b) After immersing the burgers in the cryogenic solution according to the invention for 15 seconds their core temperature had dropped by 3° C.

These tests were reproduced several times under the same operating conditions and using the same temperature probe, giving rise to the same results.

In order to demonstrate the performances obtained according to the invention, tests were also carried out on the quick freezing of individual food products, traditionally carried out in suitable metal or polymer molds (for example, individual confectionary or ice creams in the form of small characters).

In order to do this, the following steps were carried out:

Creation of the mold:

A mixture of carbon dioxide snow and liquid nitrogen according to the invention was prepared according to the method described above (incorporation of $CO_2$ until a range of 40 to 60% of $CO_2$ was obtained), in order to obtain a "shapeable" paste, the initial temperature of which was around −190° C.

This cryogenic paste was then deposited on a rimmed tray, the surface of which was smoothed, and in order to create molds of desired shapes (for example, of small characters), imprints were created in the paste by pressing then removing suitable molds.

Deposition of the food product to be frozen:

The product to be frozen (for example, an ice cream) was then cast in the imprints. The setting of the deposits firstly, then their freezing secondly, was rapid, by contact with the cryogenic slurry forming the imprints in question.

Demolding was then carried out naturally, without trouble, without sticking and without deformation of the character, quite simply by sublimation of the carbon dioxide snow and vaporization of the nitrogen.

It can clearly be seen that such a method then makes it possible to obtain products that are usually very tricky to obtain, of small size, of very variable shape, under exceptional hygienic conditions since there is no contact between the product to be frozen and a potentially soiled metal or polymer mold surface.

In summary, the advantages of the invention may be recapitulated thus:

the use of such a solution is compatible with existing installations without requiring modifications (and, for example, in the food industry: tunnels, churns, immersion freezers, etc.);
 with all types of products and especially the most difficult to obtain such as individual products, products that can be portioned into sachets, etc.; and
 the contact time is improved, by a better adhesion of the "slurry" to the product, the increased cooling capacity, the improved yield of the installation (it is possible to put forward the fact that it is possible to move, in an existing installation that normally operates under liquid nitrogen or liquid $CO_2$, two to three times more products per unit of time).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for chilling a product, comprising contacting the product with a mixture of carbon dioxide snow and liquid nitrogen, wherein the mixture is a slurry and the carbon dioxide snow is suspended in the liquid nitrogen.

2. A process for chilling a product, comprising contacting the product with a mixture of carbon dioxide snow and liquid nitrogen, wherein a temperature of the mixture is about −190° C. to about −196° C.

3. A process for chilling a product, comprising contacting the product with a mixture of carbon dioxide snow and liquid nitrogen.

4. The process for chilling a product of claim 3, further comprising the steps of:

producing the mixture of carbon dioxide snow and liquid nitrogen by mixing the carbon dioxide snow and liquid nitrogen in a tank with a variable-speed stirrer; and
 controlling an amount of the carbon dioxide snow in the mixture by:
 measuring a conductivity of the mixture; and
 adjusting a rate of stirring of the stirrer based upon the measured conductivity.

5. The process for chilling a product of claim 3, wherein the product is a food product.

6. The process for chilling a product of claim 3, wherein the mixture has a carbon dioxide content of 5-80%.

7. The process for chilling a product of claim 3, wherein the mixture has a carbon dioxide content of 15-30%.

8. The process for chilling a product of claim 3, wherein the product is immersed in the mixture.

9. The process for chilling a product of claim 3, wherein the product is a food product.

10. The process for chilling a product of claim 9, wherein the food product is a beefburger.

11. The process for chilling a product of claim 3, wherein the mixture is a paste having a carbon dioxide content of 40-60%.

12. The process for chilling a product of claim 11, further comprising the steps of:

depositing the mixture onto a tray;
 smoothing a surface of the deposited mixture;
 pressing a mold into the deposited mixture to form a molded mixture; and
 removing the mold from molded mixture.

13. The process for chilling a product of claim 12, further comprising the step of freezing ice cream on the molded mixture in the shape of the mold.

14. The process for chilling a product of claim 3, wherein the product is a food product and the food product is contacted with the mixture in a tunnel, churn, or immersion freezer.

* * * * *